(12) United States Patent
Borisov et al.

(10) Patent No.: US 12,517,794 B1
(45) Date of Patent: Jan. 6, 2026

(54) HOT SWAPPABLE PERSISTENT VOLUMES IN CONTAINER ORCHESTRATION SYSTEMS

(71) Applicant: Dell Products L.P., Round Rock, TX (US)

(72) Inventors: Mikhail Borisov, Dublin (IE); Kalyan C Gunda, Shrewsbury, MA (US); Sherry Quan, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/936,175

(22) Filed: Nov. 4, 2024

(51) Int. Cl.
*G06F 11/00* (2006.01)
*G06F 11/16* (2006.01)
*G06F 11/20* (2006.01)
*G06F 13/40* (2006.01)
*G06F 21/60* (2013.01)

(52) U.S. Cl.
CPC ...... *G06F 11/1658* (2013.01); *G06F 11/2094* (2013.01); *G06F 13/4081* (2013.01); *G06F 21/604* (2013.01)

(58) Field of Classification Search
CPC ............. G06F 11/1658; G06F 11/2094; G06F 11/1662; G06F 11/2097; G06F 11/3024
See application file for complete search history.

(56) References Cited

U.S. PATENT DOCUMENTS

| 2022/0276929 A1* | 9/2022 | Prashant | G06F 11/1662 |
| 2023/0071714 A1* | 3/2023 | Huo | G06F 9/45558 |
| 2023/0115261 A1* | 4/2023 | Xiao | G06F 9/45558 |
| | | | 718/104 |

* cited by examiner

*Primary Examiner* — Katherine Lin
(74) *Attorney, Agent, or Firm* — Amin, Turocy & Watson, LLP

(57) ABSTRACT

Hot swappable persistent volumes in container orchestration systems (e.g., using a computerized tool), is enabled. For example, a system can comprise at least one processor, and at least one memory that stores executable instructions that, when executed by the at least one processor, facilitate performance of operations. The operations can comprise, in response to a determination that a late binding condition associated with a generation of a container in a container orchestration system has been satisfied, generating the container, concurrently with the generating of the container, initiating a node stage volume process and a node publish volume process for a persistent volume to be mounted to the container, in response to a determination that the persistent volume has been published, initiating a container publish volume request applicable to the persistent volume, and mounting the persistent volume to the container.

20 Claims, 10 Drawing Sheets

HOT SWAPPABLE PERSISTENT VOLUMES IN CONTAINER ORCHESTRATION SYSTEMS

BACKGROUND

Container orchestration systems automate deployment, scaling, and management of containerized applications and workloads. Container orchestration systems enable the deployment of common applications across different environments, for instance, without redesigning the application. Typically, a volume is mounted to a container for storage. Currently, in order to mount a persistent volume to a container, the container must be in a pending state.

The above-described background relating to container orchestration systems is merely intended to provide a contextual overview of some current issues and is not intended to be exhaustive. Other contextual information may become further apparent upon review of the following detailed description.

DETAILED DESCRIPTION

Figure 1:
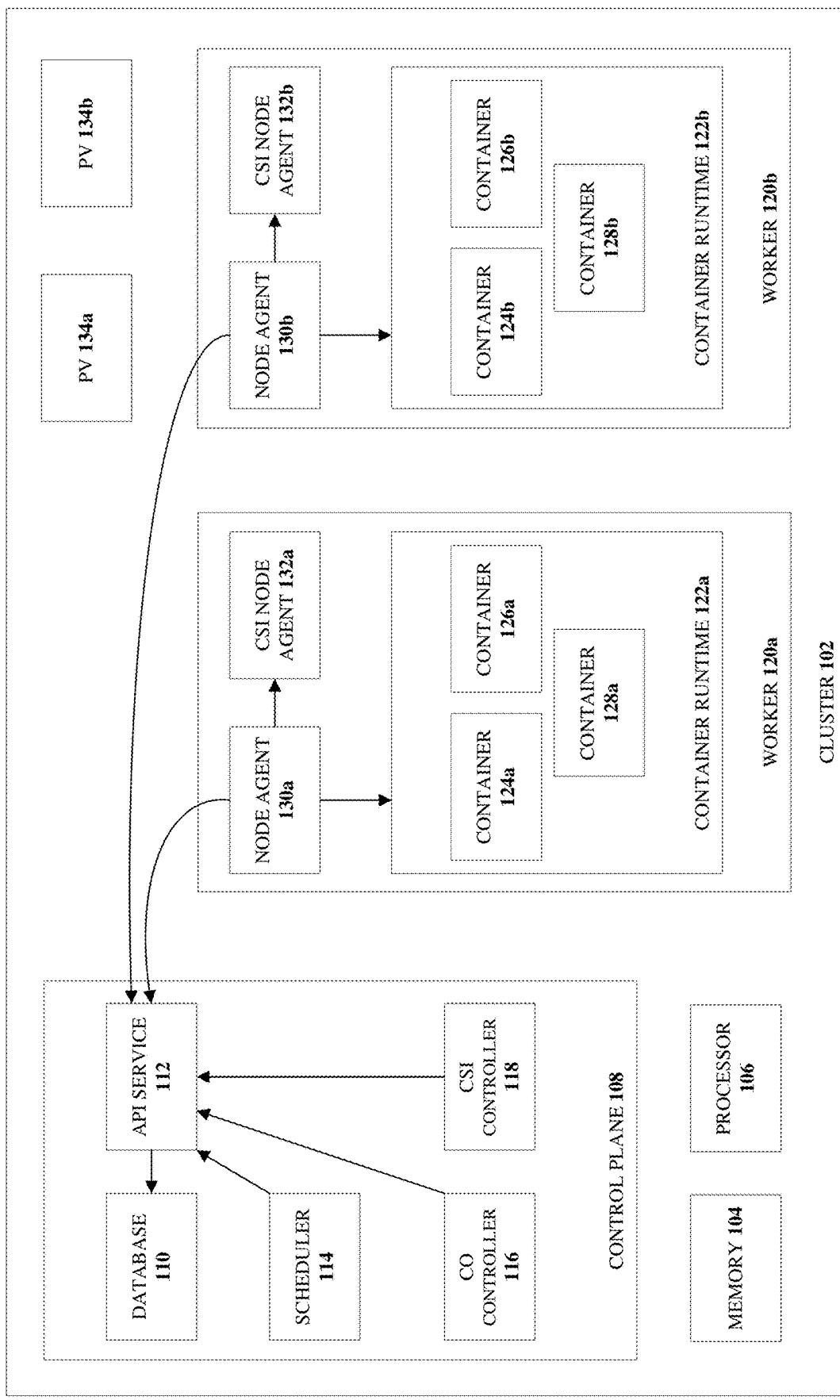
FIG. 1 is a block diagram of a non-limiting example cluster in accordance with one or more example embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, persistent volume mounting can be improved in various ways, and various example embodiments are described herein to this end and/or other ends.

According to an example embodiment, a system can comprise at least one processor, and at least one memory that stores executable instructions that, when executed by the processor, facilitate performance of operations, comprising, in response to a determination that a late binding condition associated with a generation of a container in a container orchestration system has been satisfied, generating the container, concurrently with the generating of the container, initiating a node stage volume process and a node publish volume process for a persistent volume to be mounted to the container, in response to a determination that the persistent volume has been published, initiating a container publish volume request applicable to the persistent volume, and mounting the persistent volume to the container.

In one or more example embodiments, the container can be generated prior to the mounting of the persistent volume to the container.

In one or more example embodiments, the above operations can further comprise monitoring, using a container storage interface controller, a mount status of the persistent volume.

In one or more example embodiments, the above operations can further comprise, after the mounting of the persistent volume to the container, and in response to a determination that the persistent volume has become unmounted from the container, determining whether the persistent volume is remountable to the container. In this regard, the above operations can further comprise, in response to a determination that the persistent volume is remountable to the container, remounting the persistent volume to the container. In additional embodiments, the persistent volume can be a first persistent volume, and the above operations can further comprise, in response to a determination that the persistent volume is not remountable to the container, initiating a node stage volume process and a node publish volume process for a second persistent volume to be mounted to the container, in response to a determination that the second persistent volume has been published, initiating a container publish volume request applicable to the second persistent volume, and mounting the second persistent volume to the container. In this regard, the second persistent volume can be mounted to the container without restarting the container.

In one or more example embodiments, the above operations can further comprise, in response to a determination that an unmount condition applicable to the persistent volume has been satisfied, unmounting, without stopping the container, the persistent volume from the container. In this regard, the above operations can further comprise, in response to a determination that a remount condition applicable to the persistent volume has been satisfied, remounting, without stopping the container, the persistent volume to the container. Further in this regard, the unmount condition can comprise a defined maintenance operation, and the remount condition can comprise a determination that the defined maintenance operation has completed.

In another example embodiment, a non-transitory machine-readable medium can comprise executable instructions that, when executed by a processor, facilitate performance of operations, comprising, in response to a determination that an unmount condition applicable to a first persistent volume mounted to a pod of a container orchestration system has been satisfied, unmounting, without stopping the pod, the first persistent volume from the pod, and in response to a determination that a mount condition applicable to a second persistent volume has been satisfied, mounting, without stopping the pod, the second persistent volume to the pod.

In one or more example embodiments, the above operations can further comprise initiating a node stage volume process and a node publish volume process for the second persistent volume, and in response to a determination that the second persistent volume has been published, initiating a container publish volume request applicable to the second persistent volume. In this regard, the unmount condition can comprise a persistent volume storage size change condition, and the mount condition can comprise a determination that the second persistent volume comprises a storage size that satisfies the persistent volume storage size change condition.

In one or more example embodiments, the second persistent volume can be mounted to the pod without restarting the pod.

In one or more example embodiments, the above operations can further comprise monitoring, using a container storage interface controller, a first mount status of the first persistent volume and a second mount status of the second persistent volume.

In yet another example embodiment, a method can comprise, in response to a determination that a late binding condition associated with a generation of a pod in a pod orchestration system has been satisfied, generating, by a system comprising at least one processor, the pod, concurrently with the generating of the pod, initiating, by the system, a node stage volume process and a node publish volume process for a persistent volume to be mounted to the pod, in response to a determination that the persistent volume has been published, initiating, by the system, a container publish volume request applicable to the persistent volume, and mounting, by the system, the persistent volume to the pod.

In one or more example embodiments, the pod has been granted system administrator authorization associated with permission corresponding to a system administrator.

In one or more example embodiments, the persistent volume can be mounted to the pod without stopping the pod.

In one or more example embodiments, the above method can further comprise, after the mounting of the persistent volume to the pod, and in response to a determination that the persistent volume is unmounted from the pod, determining, by the system, whether the persistent volume is remountable to the pod. In this regard, the method can further comprise, in response to a determination that the persistent volume is remountable to the pod, mounting, by the system, the persistent volume to the pod.

Turning now to FIG. 1, there is illustrated an example, non-limiting cluster 102 (e.g., a system herein) in accordance with one or more example embodiments herein. In various example embodiments, the cluster 102 can be part of and/or comprise a container orchestration system. The cluster 102 can comprise a computerized tool, which can be configured to perform various operations relating to hot swappable persistent volumes in container orchestration systems. The cluster 102 can comprise one or more of a variety of components, such as memory 104, processor 106, control plane 108, worker 120a, worker 120b, persistent volume (PV) 134a, and/or PV 134b. In various example embodiments, one or more of the memory 104, processor 106, control plane 108, worker 120a, worker 120b, persistent volume (PV) 134a, and/or PV 134b can be communicatively or operably coupled (e.g., over a bus or wireless network) to one another to perform one or more functions of the cluster 102.

In various example embodiments, the control plane 108 can comprise database 110, application programming interface (API) 112, scheduler 114, container orchestration (CO) controller 116, and/or container storage interface (CSI) controller 118. In various example embodiments, the worker 120a (e.g., a worker node) can comprise node agent 130a, CSI node agent 132a, and/or container runtime 122a. In various example embodiments, the container runtime 122a can comprise container 124a, container 126a, and/or container 128a, though any suitable quantity of containers (e.g., pods) can be utilized. Similarly, the worker 120b (e.g., a worker node) can comprise node agent 130b, CSI node agent 132b, and/or container runtime 122b. In various example embodiments, the container runtime 122b can comprise container 124b, container 126b, and/or container 128b, though any suitable quantity of containers (e.g., pods) can be utilized.

It is noted that while various cluster 102 components or elements described herein can perform one or more corresponding functions, processes, or actions, the cluster 102, components, or elements as a whole and/or the processor 106 can be configured to perform one or more of the described functions, processor, or actions.

In various example embodiments, the API service 112 can comprise a core component of the CO control plane. The API service 112 can expose API endpoints that enables users, different parts of the cluster 102, and/or external components to communicate with each other. The database 110 (e.g., etcd) can comprise a persistent layer, which can store configuration, events, etc. The scheduler 114 can enable scheduling associated with the cluster 102 herein, such as assigning containers onto worker nodes. The CO controller 116 can maintain a current cluster 102 state closer to a desired state (e.g., as defined by the cluster 102 configuration).

In various example embodiments, a node agent 130 (e.g., node agent 130a or node agent 130b) (e.g., a Kubelet in Kubernetes) can comprise the primary agent that runs on each worker node (e.g., worker 120a or worker 120b). In various example embodiments, the node agent 130 can interact with a respective container runtime 122 (e.g., container runtime 122a or 122b) (e.g., to start and stop containers herein). In this regard, the container runtime 122 can comprise Linux-based container management (e.g., Docker, Containerd, etc.). In various example embodiments, the CSI can comprise an interface for storage management and can comprise the CSI controller 118 and CSI node agent 132 (e.g., CSI node agent 132a or 132b). In various example embodiments, The CSI controller 118 can facilitate, for instance, volume creation or deletion requests from the CO controller 116, and the CSI node agent can facilitate, for instance, volume publish or unpublish requests from node agent 130.

In various example embodiments, pods (e.g., containers herein) can follow a defined lifecycle, starting in the pending phase, moving through running, for instance, if at least one of its primary containers starts successfully, and then transitioning to either the succeeded or failed phases, for instance, depending on whether any container in terminated in failure.

In various example embodiments, the CO controller 116 can utilize persistent volumes and Persistent Volume Claims (PVCs) to manage storage lifecycle. The persistent volume lifecycle is independent of any particular container in the cluster 102. PVCs are requests made, for instance, by a container user or application for specific types of storage.

Conventionally, however, in order to mount persistent volume to a container, the container must be pending state:
1. Node agent issues NodeStage Volume and NodePublish Volume requests to CSI to mount PV to global (VOL_READY) and container directories (PUBLISHED).
2. Node agent starts container with volume (filesystem mode) or device (block mode) container runtime configuration.

Conventionally, to un-mount a persistent volume from a container in a running state the flow is as follows:
1. Node agent stops pod's container first.
2. Node agent issues NodeUnpublish Volume and NodeUnstage Volume requests to CSI to un-mount PV from Pod's container and global directories.

This conventional approach works well for the stateful applications with single or multiple volumes but lacks the ability to tolerate volume failures. For other stateful applications (e.g., storage systems) when multiple volumes (e.g., disks) are mounted to the single container (e.g., an IO engine in case of storage systems), as a consequence, disks cannot be hot swapped without application restart in the CO. Also, new persistent volumes (e.g., disk addition use case) cannot be mounted when container is running. As a result, IO disruption can occur, for instance, during the following activities:
1. Replacement of faulty disk—in order to un-mount unhealthy disk and mount new healthy disk container restart is required.
2. Handling of missing disk—to restore mount container restart is required.
3. Shrink or expansion—to add or remove a persistent volume to or from a container, a restart is required.
4. Disk maintenance—when a disk must be unmounted for specific service operation, such as filesystem check or restore, firmware upgrade, health self-test, etc.

To address these problems, embodiments herein enable separated container and persistent volume lifecycle in container orchestration systems herein. Embodiments herein enable a persistent volume parameter of lateBinding which can be set (e.g., via a node agent 130) to true or false. When lateBinding is set to true, a node agent 130 can immediately start a container without waiting for the persistent volume to be VOL_READY and PUBLISHED. In parallel, the node agent 130 can issue NodeStage Volume and NodePublish Volume requests. Once the persistent volume is PUBLISHED, and the container is running, the node agent 130 can issue ContainerPublish Volume request to CSI controller 118. The CSI controller 118 can call a mount instruction inside running a container using an exec container runtime API. In various example embodiments, the CSI controller 118 can track persistent volume mount status inside a container herein, and re-mount it in case of un-mount event (e.g., disk missing). The foregoing enables hot plug or unplug of the persistent without a container or worker node restart. As a result, the node agent 130 can start a container herein without waiting for persistent volume availability, and the persistent volume can be mounted or unmounted at any later time.

According to an example embodiment, the node agent 130 (e.g., node agent 130*a* or node agent 130*b*), can, in response to a determination (e.g., via the node agent 130) that a lateBinding condition associated with a generation of a container (container 124*a* or 124*b*, container 126*a* or 126*b*, and/or container 128*a* or 126*b*) in a container orchestration system has been satisfied (e.g., set to true), generate the container. When lateBinding is set to true, a node agent 130 can immediately start a container without waiting for a corresponding persistent volume to be VOL_READY and PUBLISHED. In various example embodiments, the container (e.g., a pod) can possess (and/or has been granted) system administrator authorization associated with permission corresponding to a system administrator.

According to an example embodiment, the node agent 130 can, concurrently with the generating of the container, initiate a node stage volume process (e.g., NodeStage Volume) and a node publish volume process (e.g., NodePublishVolume) for a persistent volume (e.g., PV 134*a* or PV 136*b*) to be mounted to the container (e.g., container 124, container 126, or container 128 of worker 120*a* or worker 120*b*). In various example embodiments, NodeStage Volume can be responsible for preparing or staging a volume on a worker node herein. In various example embodiments, NodePublish Volume can make a volume available to a specific Pod or container, for instance, by mounting the volume to the container's filesystem.

According to an example embodiment, the node agent 130 can, in response to a determination (e.g., via the node agent 130) that the persistent volume has been published, initiate a container publish volume request (e.g., ContainerPublishVolume) applicable to the persistent volume (e.g., PV 134*a* or PV 134*b*). In various example embodiments, the node agent 130 can issue the container publish volume request to the CSI (e.g., CSI node agent 132 and/or CSI controller 118). According to an example embodiment, the CSI (e.g., CSI node agent 132 and/or CSI controller 118) can mount the persistent volume (e.g., PV 134*a* or PV 134*b*) to the container (e.g., container 124, container 126, or container 128 of worker 120*a* or worker 120*b*). In various example embodiments, the container (e.g., container 124, container 126, or container 128) can be generated (e.g., via the node agent 130) prior to the mounting (e.g., via the CSI) of the persistent volume to the container herein. According to an example embodiment, the CSI (e.g., CSI node agent 132 and/or CSI controller 118) can monitor a mount status of the persistent volume (e.g., PV 134*a* or PV 134*b*).

According to an example embodiment, the node agent 130 can, after the mounting of the persistent volume (e.g., PV 134*a* or PV 134*b*) to the container (e.g., container 124, container 126, or container 128), and in response to a determination (e.g., via the node agent 130) that the persistent volume (e.g., PV 134*a* or PV 134*b*) has become unmounted from the container (e.g., container 124, container 126, or container 128), determine whether the persistent volume (e.g., PV 134*a* or PV 134*b*) is remountable to the container (e.g., container 124, container 126, or container 128). In various example embodiments, the CSI can, in response to a determination (e.g., via the node agent 130) that the persistent volume (e.g., PV 134*a* or PV 134*b*) is remountable to the container (e.g., container 124, container 126, or container 128), remount the persistent volume (e.g., PV 134*a* or PV 134*b*) to the container (e.g., container 124, container 126, or container 128).

In further embodiments, the node agent 130 can, in response to a determination (e.g., via the node agent 130) that the persistent volume (e.g., PV 134*a*) is not remountable to the container (e.g., container 124, container 126, or container 128), initiate a node stage volume process (e.g., NodeStage Volume) and a node publish volume process (e.g., NodePublish Volume) for a second persistent volume (e.g., PV 134*b*) to be mounted to the container (e.g., container 124, container 126, or container 128). The node agent 130 can then, in response to a determination that the second persistent volume (e.g., PV 134*b*) has been published, initiate a container publish volume request (e.g., ContainerPublish Volume) applicable to the second persistent volume (e.g., PV 134*b*). The CSI (e.g., CSI node agent 132 and/or CSI controller 118) can then mount the second persistent volume (e.g., PV 134*b*) to the container (e.g., container 124, container 126, or container 128). It is noted that the second persistent volume is mounted (e.g., via the CSI) to the container (e.g., container 124, container 126, or container 128) without restarting the container (e.g., container 124, container 126, or container 128) and/or without stopping the container (e.g., container 124, container 126, or container 128).

According to an example embodiment, the CSI (e.g., CSI node agent 132 and/or CSI controller 118) can, in response to a determination (e.g., via the node agent 130) that an unmount condition applicable to the persistent volume (e.g., PV 134*a* or PV 134*b*) has been satisfied, unmount (without stopping the container (e.g., container 124, container 126, or container 128)), the persistent volume (e.g., PV 134*a* or PV 134*b*) from the container (e.g., container 124, container 126, or container 128). The CSI (e.g., CSI node agent 132 and/or CSI controller 118) can then, in response to a determination (e.g., via the node agent 130) that a remount condition applicable to the persistent volume (e.g., PV 134*a* or PV 134*b*) has been satisfied, remount (without stopping the container (e.g., container 124, container 126, or container 128)) the persistent volume (e.g., PV 134*a* or PV 134*b*) to the container (e.g., container 124, container 126, or container 128).

It is noted that, in various example embodiments, an unmount condition herein can comprise a defined maintenance operation, and the remount condition comprises a determination (e.g., via the node agent 130) that the defined maintenance operation has completed. For instance, such a defined maintenance condition can comprise replacement of a faulty disk, handling of a missing disk, shrink or expansion of a disk, disk maintenance, or other suitable defined maintenance operations. By enabling hot swappable persistent volumes in container orchestration systems herein, such defined maintenance operations herein can be performed without a container or worker node restart.

According to an example embodiment, the CSI (e.g., CSI node agent 132 and/or CSI controller 118) can, in response to a determination (e.g., via the node agent 130) that an unmount condition applicable to a first persistent volume (e.g., PV 134*a*) mounted to a pod (e.g., container 124, container 126, or container 128) of a container orchestration system has been satisfied, unmount (e.g., without stopping the pod), the first persistent volume (e.g., PV 134*a*) from the pod. The CSI (e.g., CSI node agent 132 and/or CSI controller 118) can then, in response to a determination (e.g., via the node agent 130) that a mount condition applicable to a second persistent volume (e.g., PV 134*b*) has been satisfied, mount (without stopping the pod), the second persistent volume (e.g., PV 134*b*) to the pod. In various example embodiments, the second persistent volume (e.g., PV 134*b*) can be mounted (e.g., via the CSI) to the pod without restarting the pod. In various example embodiments, such an unmount condition can comprise a determination (e.g., via the node agent 130) that a disk herein is faulty or missing, and thus in need of replacement and therefore requires a new persistent volume.

In various example embodiments, the node agent 130 can initiate a node stage volume process (e.g., NodeStageVolume) and a node publish volume process (e.g., NodePublish Volume) for the second persistent volume (e.g., PV 134*b*). The node agent 130 can then, in response to a determination that the second persistent volume (e.g., PV 134*b*) has been published, initiate a container publish volume request (e.g., ContainerPublishVolume) applicable to the second persistent volume. This ContainerPublish Volume can be issued by the node agent 130 to the CSI (e.g., CSI node agent 132 and/or CSI controller 118). In various example embodiments, the unmount condition can comprise a persistent volume storage size change condition, and the mount condition comprise a determination (e.g., via the node agent 130) that the second persistent volume (e.g., PV 134*b*) comprises a storage size that satisfies the persistent volume storage size change condition. In another example embodiment, the unmount condition can comprise a failure of a first persistent volume (e.g., PV 134*a*), and the mount condition can comprise a selection (e.g., via the node agent 130) of a replacement persistent volume (e.g., PV 134*b*).

In various example embodiments, the CSI (e.g., CSI node agent 132 and/or CSI controller 118) and/or the node agent 130 can monitor a first mount status of the first persistent volume (e.g., PV 134*a*) and/or a second mount status of the second persistent volume (e.g., PV 134*b*). By monitoring the mount status, the cluster 102 can be enabled to determine if and/or when a persistent volume herein is available for utilization.

Figure 2:
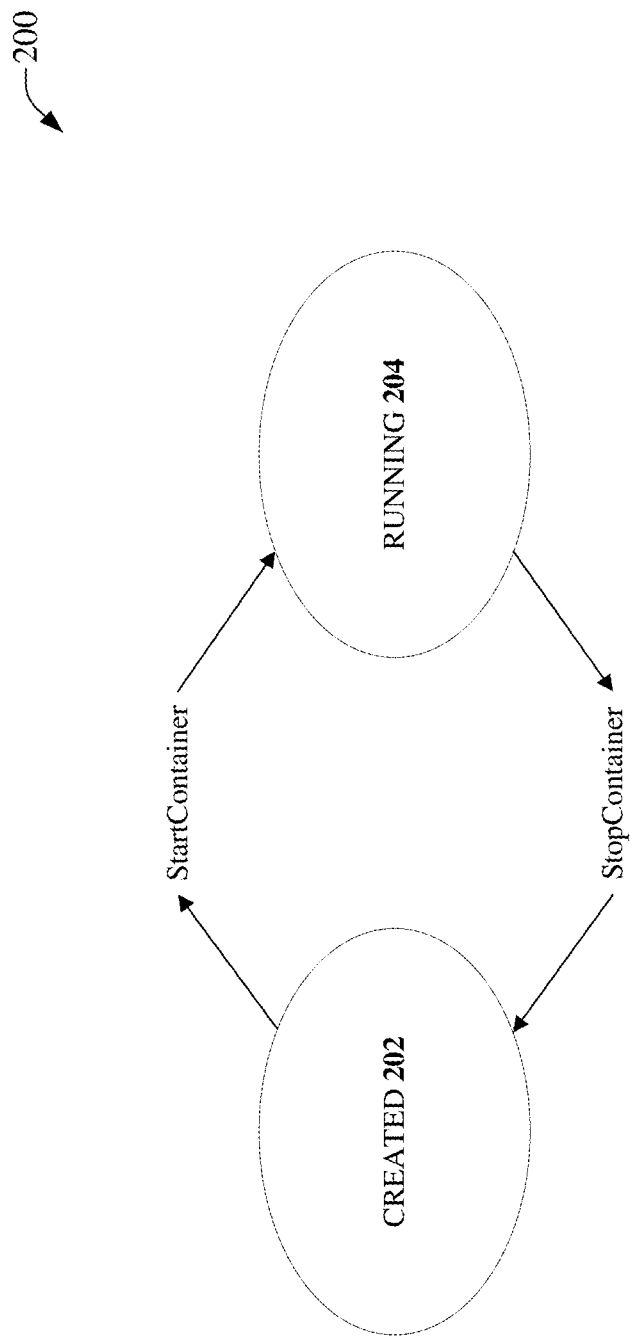
FIG. 2 is a flow diagram an example container starting flow process in accordance with one or more example embodiments described herein.
Figure 3:
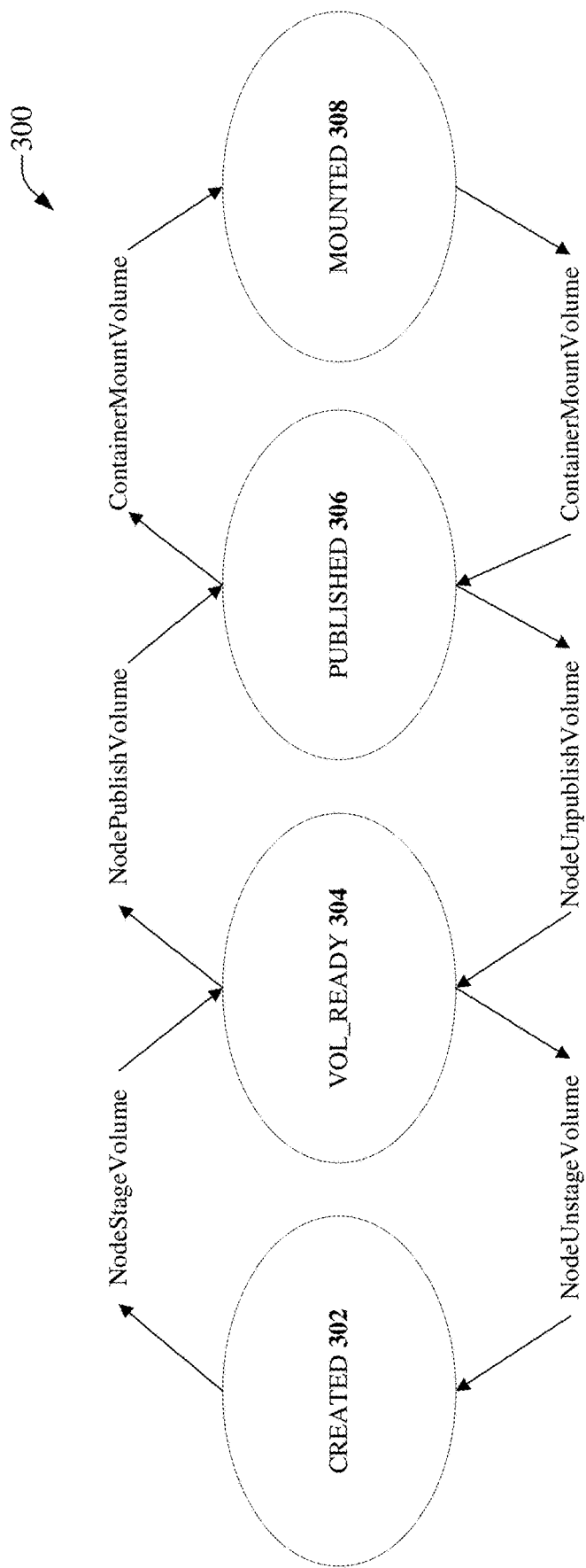
FIG. 3 is a flow diagram an example persistent volume mounting flow process in accordance with one or more example embodiments described herein.

FIGS. 2 and 3 are separate respective flow diagrams of separate respective container starting flow 200 and persistent volume mounting flow 300 processes in accordance with one or more example embodiments described herein. With respect to FIG. 2, at the created stage 202, a container herein (e.g., a pod) can be defined, scheduled, and/or started (e.g., by the node agent 130). Defined processes StartContainer and StopContainer can be utilized, for instance, in order to move between the created stage 202 and the running stage 204. The node agent 130 can manage the StartContainer and StopContainer processes. For instance, the StartContainer process can comprise initialization and the start of containers, which can include the setup of the container runtime environment, configuration of associated networking, and mounting of storage volumes. The StopContainer process can comprise the stop and cleanup of containers after a corresponding worker node is stopped. At the running stage 204, a container herein can be running, independently of whether a volume (e.g., persistent volume) is ready and/or mounted.

With respect to FIG. 3, independent of the stage (e.g., created stage 202 or running stage 204) of the container herein, the node agent 130 can begin creating persistent volumes for the container at created stage 302. For instance, any volumes requested by the worker node(s) 120 can be identified in the worker node's specification. In various example embodiments, the volume herein can comprise a PersistentVolumeClaim, emptyDir, or another suitable volume type. Once the volume (e.g., a persistent volume) is ready (e.g., vol_ready stage 304), the node agent 130 can issue a container publish volume request (e.g., ContainerPublish Volume) to the CSI (e.g., CSI node agent 132 and/or CSI controller 118). Once, the CSI (e.g., CSI node agent 132 and/or CSI controller 118) mounts the respective persistent volume to the corresponding container, the mounted stage 308 is achieved.

Figure 4:
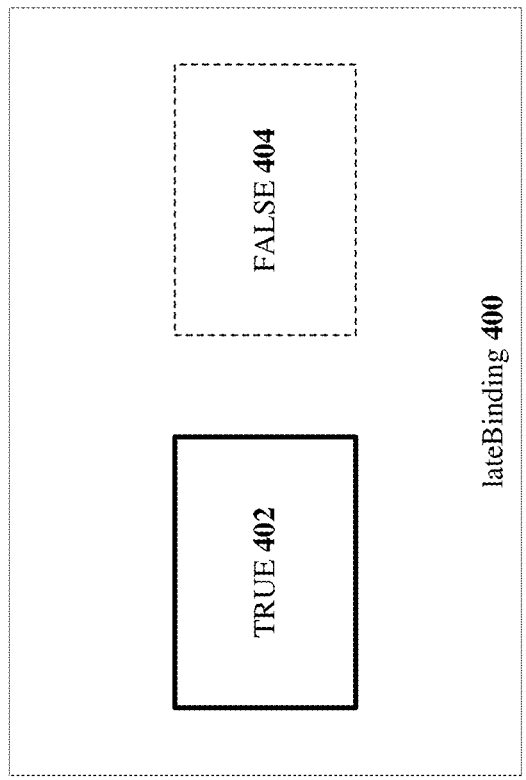
FIG. 4 is a diagram of an example late binding condition in accordance with one or more example embodiments described herein.

FIG. 4 is a diagram of an example late binding condition (e.g., lateBinding 400) in accordance with one or more example embodiments described herein. LateBinding 400 can comprise one of two conditions: true 402 or false 404. In various example embodiments, the lateBinding condition 400 can be user selectable (e.g., via a graphical user interface), though in other embodiments, the lateBinding condition 400 can be predefined for the cluster 102. When lateBinding is set to true, a node agent 130 can immediately start a container without waiting for the persistent volume to be VOL_READY and PUBLISHED.

Figure 5:
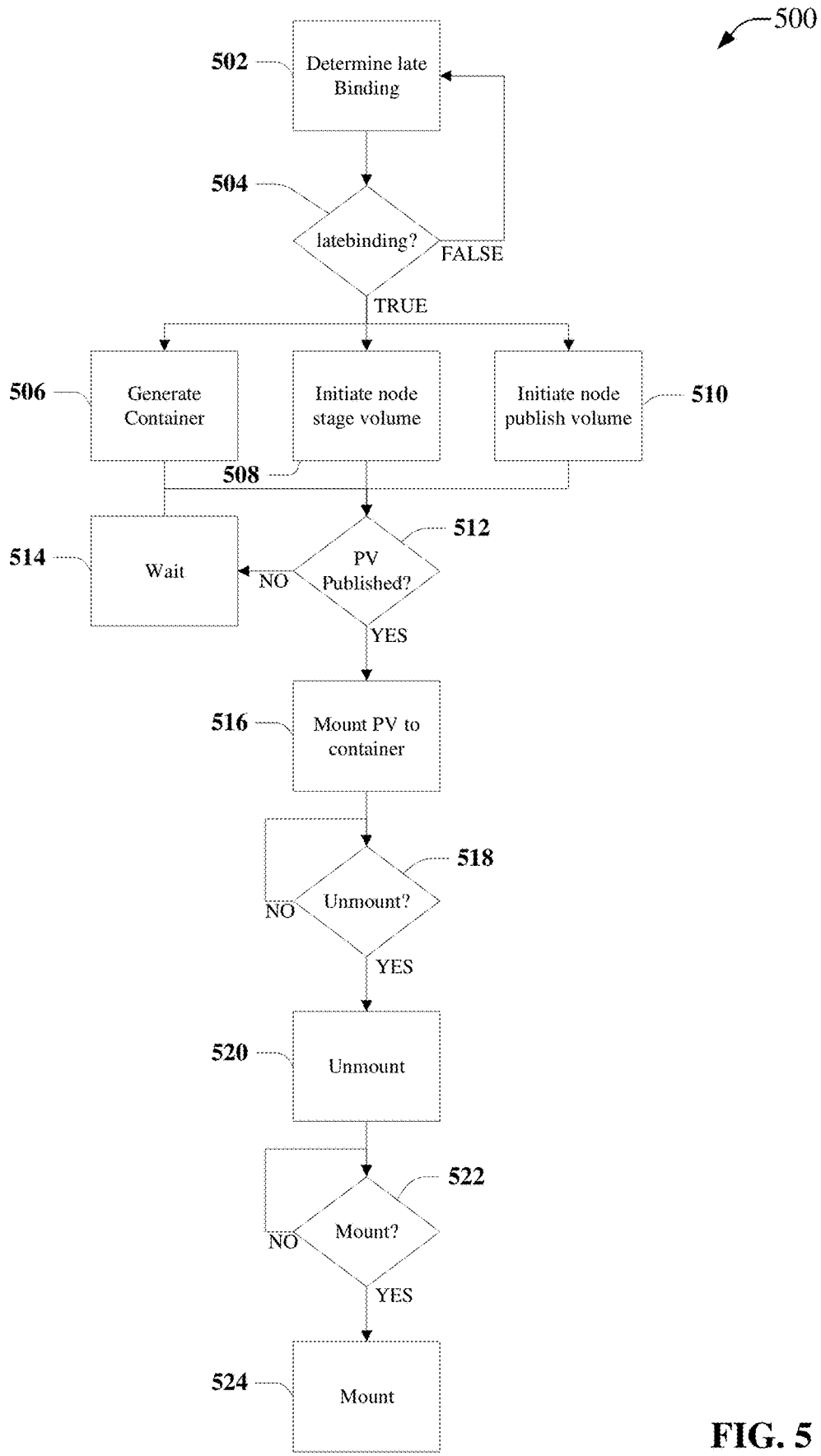
FIG. 5 is a flowchart for a process associated with hot swappable persistent volumes in container orchestration systems in accordance with one or more example embodiments described herein.

FIG. 5 is a flowchart for a process 500 associated with hot swappable persistent volumes in container orchestration systems in accordance with one or more example embodiments described herein. At 502, the node agent 130 can determine the lateBinding condition 400. At 504, in response to a determination that the lateBinding condition 400 associated with a generation of a container (container 124a or 124b, container 126a or 126b, and/or container 128a or 126b) in a container orchestration system has been satisfied (TRUE at 504), the process 500 can proceed to 506, 508, and or 510. If, at 504, the lateBinding condition 400 has not been satisfied (FALSE at 504), the process 500 can return to 502. When lateBinding is set to TRUE, the node agent 130 is enabled to immediately start a container without waiting for the persistent volume to be VOL_READY and PUBLISHED. In various example embodiments, the lateBinding condition 400 can be user selectable (e.g., via a graphical user interface), though in other embodiments, the lateBinding condition 400 can be predefined (e.g., for a cluster 102).

In various example embodiments, 506, 508, and/or 510 can occur concurrently. At 506, the node agent 130 can generate the container (e.g., container 124, container 126, or container 128). At 508, the node agent 130 can initiate a node stage volume process (e.g., NodeStage Volume). At 510, the node agent 130 can initiate a node publish volume process (e.g., NodePublish Volume) for a persistent volume (e.g., PV 134a or PV 136b) to be mounted to the container (e.g., container 124, container 126, or container 128 of worker 120a or worker 120b).

At 512, the node agent 130 can determine whether the persistent volume (e.g., PV 134a or PV 136b) has been published. If the persistent volume (e.g., PV 134a or PV 136b) has not published (NO at 512), the process 500 can proceed to 514, at which a defined waiting period can occur, and then the published state of the persistent volume (e.g., PV 134a or PV 136b) can be rechecked at 512. If, at 512, the persistent volume (e.g., PV 134a or PV 136b) is determined (e.g., via the node agent 130) to have published (e.g., YES at 512), the process 500 can proceed to 516. At 516, the CSI (e.g., CSI node agent 132 and/or CSI controller 118) can mount the persistent volume (e.g., PV 134a or PV 134b) to the container (e.g., container 124, container 126, or container 128 of worker 120a or worker 120b).

At 518, the node agent 130 can determine whether an unmount condition applicable to the persistent volume (e.g., PV 134a or PV 134b) has been satisfied. In various example embodiments, the unmount condition can comprise a persistent volume storage size change condition, and the mount condition comprise a determination (e.g., via the node agent 130) that the second persistent volume (e.g., PV 134b) comprises a storage size that satisfies the persistent volume storage size change condition. In another example embodiment, the unmount condition can comprise a failure of a first persistent volume (e.g., PV 134a). If the unmount condition applicable to the persistent volume (e.g., PV 134a or PV 134b) has not been satisfied (e.g., NO at 518), the node agent 130 can continue checking at 518. If, at 518, the unmount condition applicable to the persistent volume (e.g., PV 134a or PV 134b) has been satisfied (e.g., YES at 518), the process 500 can proceed to 520. At 520, the CSI (e.g., CSI node agent 132 and/or CSI controller 118) can unmount (without stopping the container (e.g., container 124, container 126, or container 128)), the persistent volume (e.g., PV 134a or PV 134b) from the container (e.g., container 124, container 126, or container 128).

At 522, the node agent 130 can determine whether that a remount condition applicable to the persistent volume (e.g., PV 134a or PV 134b) has been satisfied. In various example embodiments, the remount condition can comprise a determination (e.g., via the node agent 130) that a defined maintenance operation has completed, or that a persistent volume (e.g., either the original or a replacement persistent volume) is ready to be mounted. If the remount condition applicable to the persistent volume (e.g., PV 134a or PV 134b) has not been satisfied (e.g., NO at 522), the node agent 130 can continue checking at 522. If, at 522, the remount condition applicable to the persistent volume (e.g., PV 134a or PV 134b) has been satisfied (e.g., YES at 522), the process 500 can proceed to 524. At 524, the CSI (e.g., CSI node agent 132 and/or CSI controller 118) can mount (e.g., remount) (without stopping or restarting the container (e.g., container 124, container 126, or container 128)) the persistent volume (e.g., PV 134a or PV 134b) to the container (e.g., container 124, container 126, or container 128).

Figure 6:
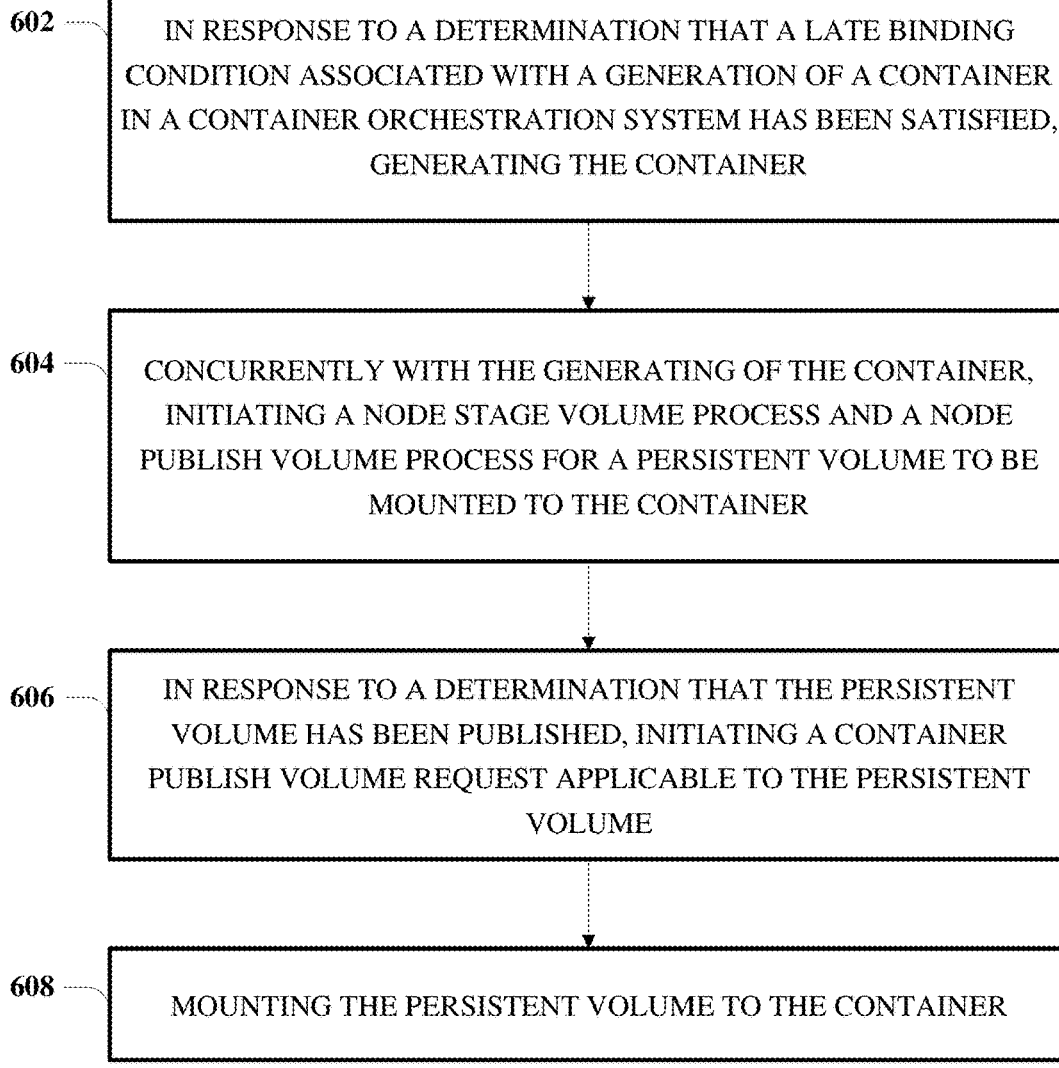
FIG. 6 is a flow diagram for a process associated with hot swappable persistent volumes in container orchestration systems in accordance with one or more example embodiments described herein.

FIG. 6 is a flow diagram for a process 600 associated with hot swappable persistent volumes in container orchestration systems in accordance with one or more example embodiments described herein. At 602, the process 600 can comprise, in response to a determination (e.g., via the node agent 130) that a late binding condition (e.g., lateBinding condition 400) associated with a generation of a container (e.g., container 124a or 124b, container 126a or 126b, and/or container 128a or 126b) in a container orchestration system has been satisfied, generating (e.g., via the node agent 130) the container. At 604, the process 600 can comprise, concurrently with the generating (e.g., via the node agent 130) of the container, initiating (e.g., via the node agent 130) a node stage volume process (e.g., NodeStageVolume) and a node publish volume process (e.g., NodePublish Volume) for a persistent volume (e.g., PV 134a or PV 136b) to be mounted to the container (e.g., container 124, container 126, or container 128 of worker 120a or worker 120b). At 606, the process 600 can comprise, in response to a determination (e.g., via the node agent 130) that the persistent volume has been published, initiating (e.g., via the node agent 130) a container publish volume request (e.g., ContainerPublish Volume) applicable to the persistent volume (e.g., PV 134a or PV 134b). At 608, the process 600 can comprise mounting (e.g., via the CSI (e.g., CSI node agent 132 and/or CSI controller 118)) the persistent volume (e.g., PV 134a or PV 134b) to the container (e.g., container 124, container 126, or container 128 of worker 120a or worker 120b).

Figure 7:
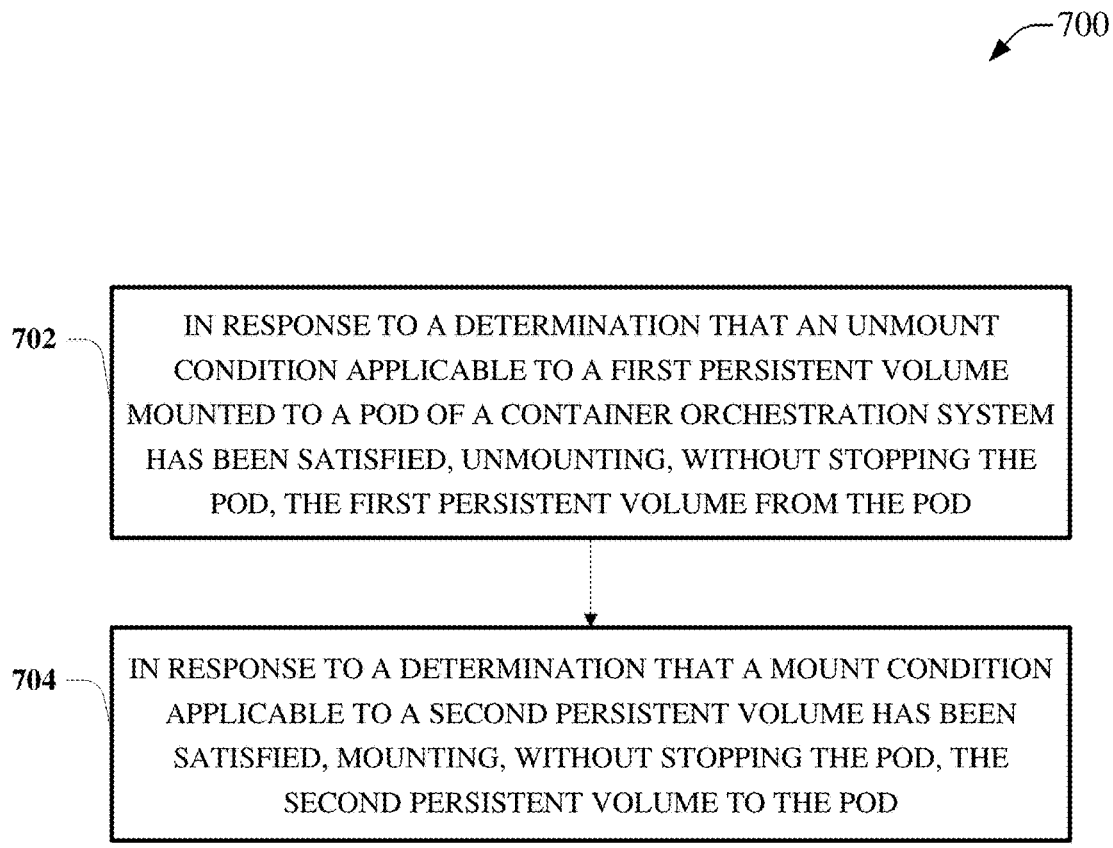
FIG. 7 is a flow diagram for a process associated with hot swappable persistent volumes in container orchestration systems in accordance with one or more example embodiments described herein.

FIG. 7 is a flow diagram for a process 700 associated with hot swappable persistent volumes in container orchestration systems in accordance with one or more example embodiments described herein. At 702, the process 700 can comprise, in response to a determination (e.g., via the node agent 130) that an unmount condition applicable to a first persistent volume (e.g., PV 134a) mounted to a pod (e.g., container) of a container orchestration system has been satisfied, unmounting (e.g., via the CSI e.g., CSI node agent 132 and/or CSI controller 118), without stopping the pod, the first persistent volume (e.g., PV 134a) from the pod. At 704, the process 700 can comprise, in response to a determination (e.g., via the node agent 130) that a mount condition applicable to a second persistent volume (e.g., PV 134b) has been satisfied, mounting (e.g., via the CSI), without stopping the pod, the second persistent volume (e.g., PV 134b) to the pod.

Figure 8:
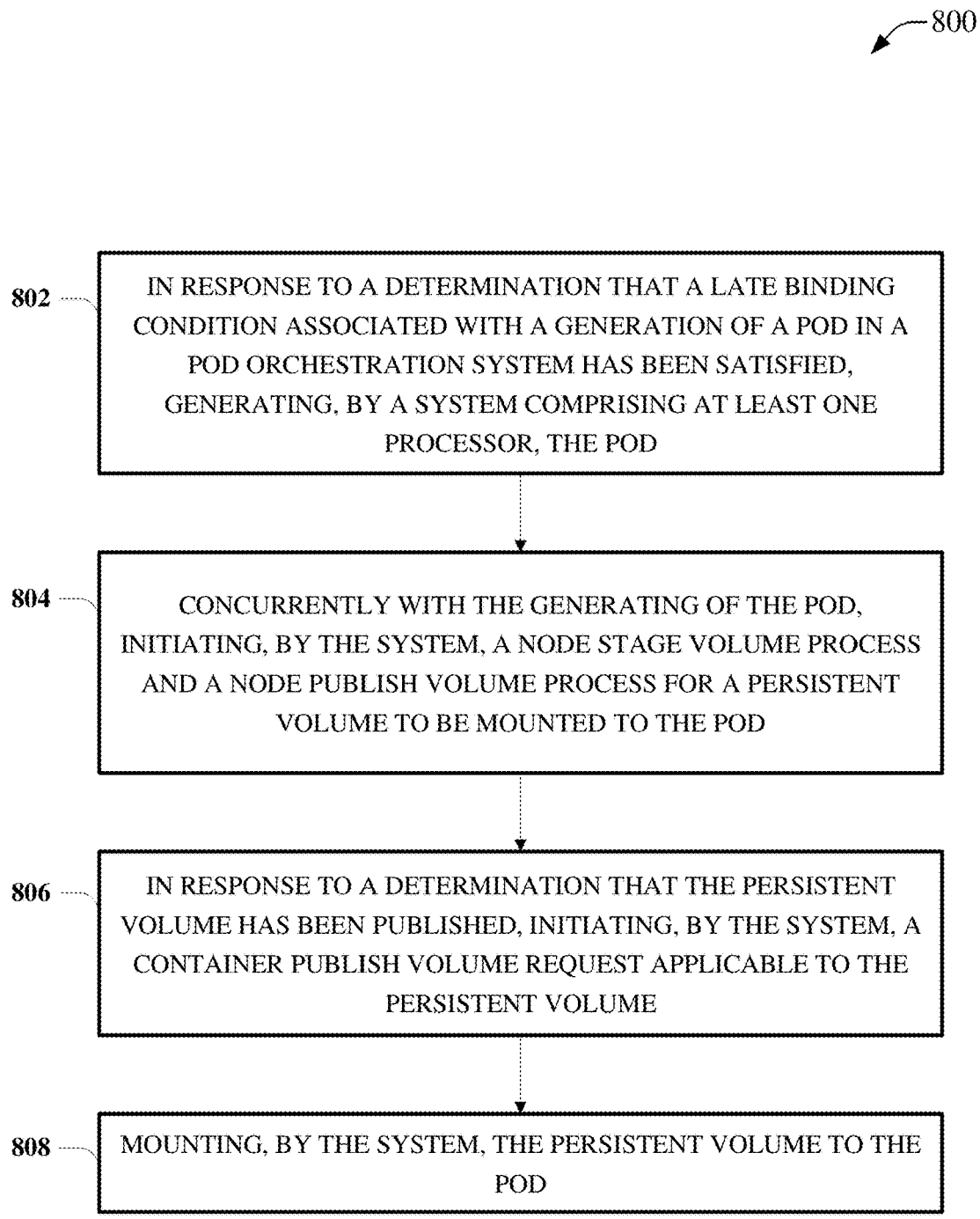
FIG. 8 is a flow diagram for a process associated with hot swappable persistent volumes in container orchestration systems in accordance with one or more example embodiments described herein.

FIG. 8 is a flow diagram for a process 800 associated with hot swappable persistent volumes in container orchestration systems in accordance with one or more example embodiments described herein. At 802, the process 800 can comprise in response to a determination (e.g., via the node agent 130) that a late binding condition (e.g., lateBinding condition 400) associated with a generation of a pod (e.g., container 124a or 124b, container 126a or 126b, and/or container 128a or 126b) in a pod orchestration system has been satisfied, generating (e.g., via the node agent 130), by a system (e.g., cluster 102) comprising at least one processor (e.g., processor 106), the pod. At 804, the process 800 can comprise, concurrently with the generating (e.g., via the node agent 130) of the pod, initiating, by the system (e.g., via the node agent 130), a node stage volume process (e.g., NodeStage Volume) and a node publish volume process (e.g., NodePublish Volume) for a persistent volume (e.g., PV 134a or PV 136b) to be mounted to the pod (e.g., container 124, container 126, or container 128 of worker 120a or worker 120b). At 806, the process 800 can comprise, in response to a determination (e.g., via the node agent 130) that the persistent volume has been published, initiating, by the system (e.g., via the node agent 130), a container publish volume request (e.g., ContainerPublish Volume) applicable to the persistent volume (e.g., PV 134a or PV 134b). At 808, the process 800 can comprise, mounting, by the system (e.g., via the CSI (e.g., CSI node agent 132 and/or CSI controller 118)), the persistent volume (e.g., PV 134a or PV 134b) to the pod (e.g., container 124, container 126, or container 128 of worker 120a or worker 120b).

Figure 9:
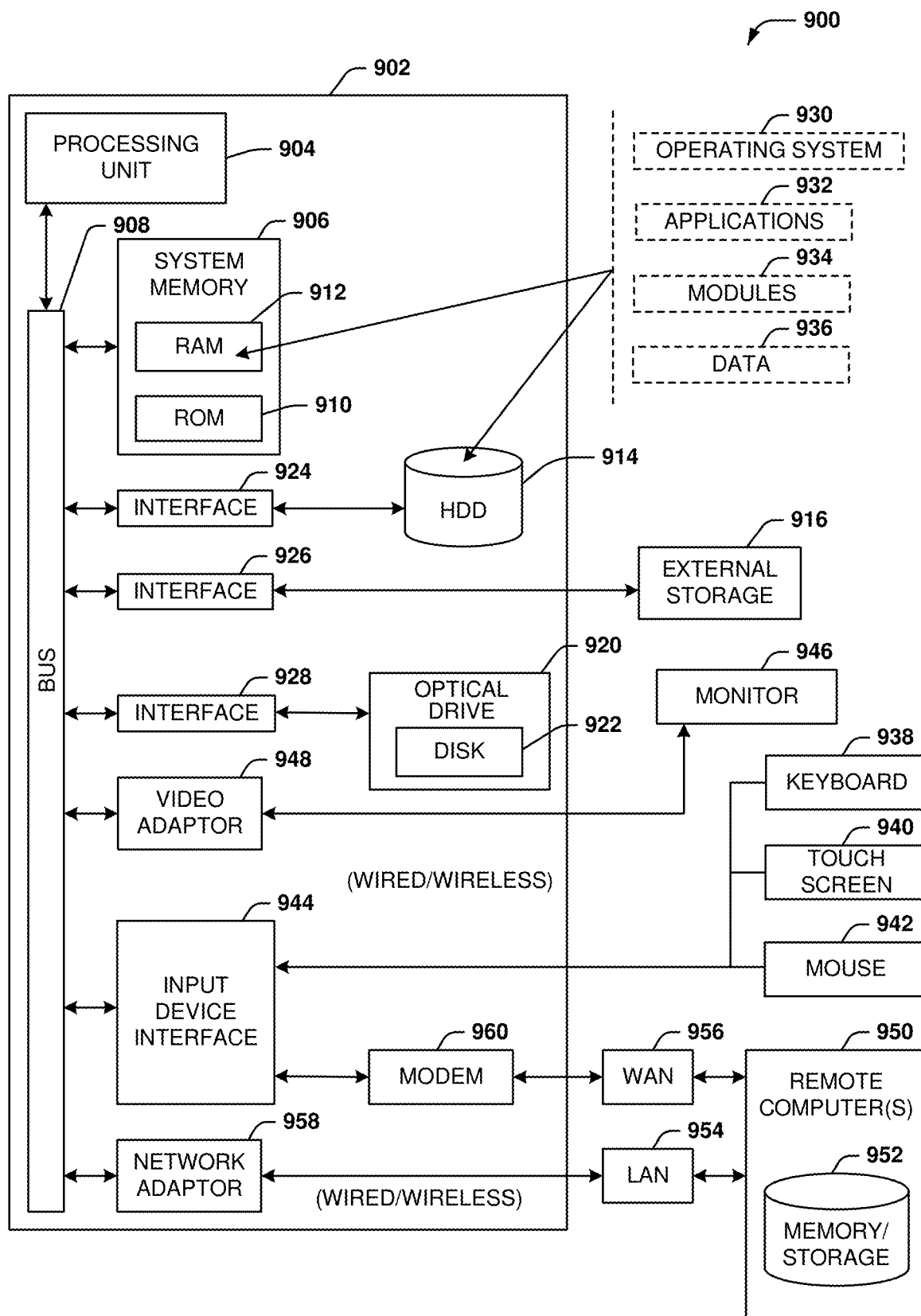
FIG. 9 is an example, non-limiting computing environment in which one or more embodiments described herein can be implemented.

In order to provide additional context for various example embodiments described herein, FIG. 9 and the following discussion are intended to provide a brief, general description of a suitable computing environment 900 in which the various example embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, modules, data structures, etc., that perform particular tasks or implement particular abstract data types. Moreover, those skilled in the art will appreciate that the various methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various example embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a disk 922, such as a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an example embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can also be connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are examples and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
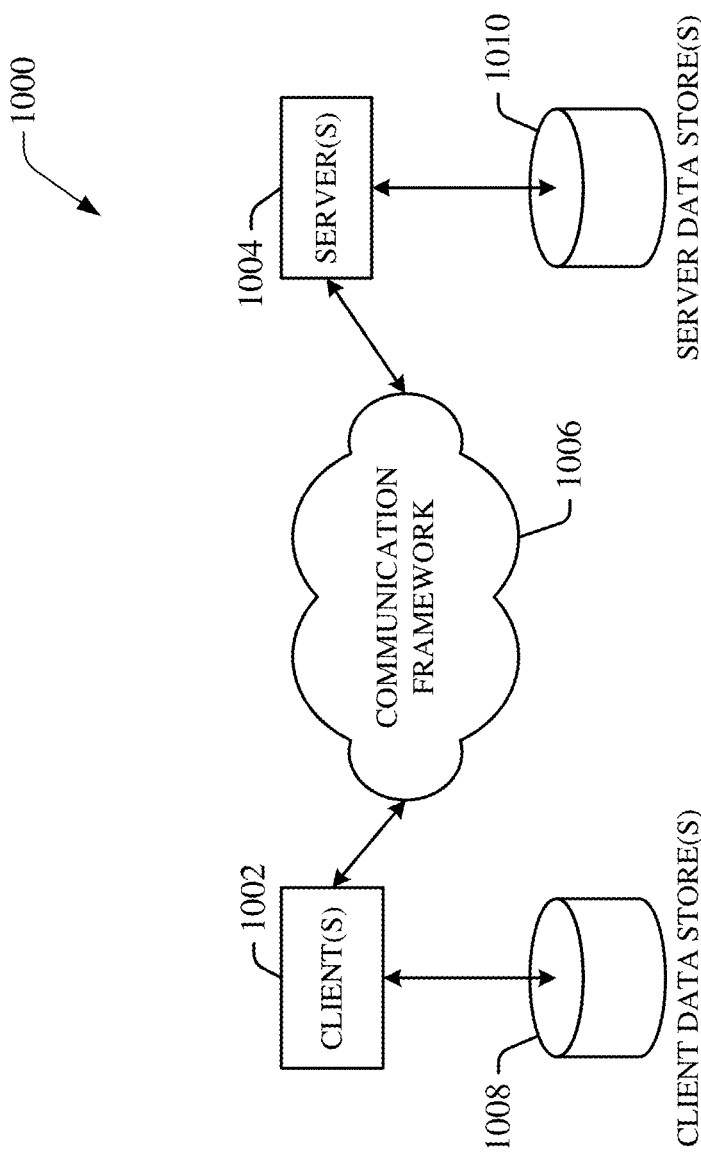
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed files to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various example embodiments. It is, of course, not possible to describe every conceivable combination of components, modules, or methods for purposes of describing the disclosed subject matter, and one skilled in the art may recognize that further combinations and permutations of the various example embodiments are possible. The disclosed subject matter is intended to embrace all such alterations, modifications, and variations that fall within the spirit and scope of the appended claims.

With regard to the various functions performed by the above-described components, modules, devices, circuits, systems, etc., the terms (including a reference to a "means") used to describe such components or modules are intended to also include, unless otherwise indicated, any structure(s) which performs the specified function of the described component or module (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various example embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   at least one processor; and
   at least one memory that stores executable instructions that, when executed by the at least one processor, facilitate performance of operations, comprising:
      in response to a determination that a late binding condition associated with a generation of a container in a container orchestration system has been satisfied, generating the container;
      concurrently with the generating of the container, initiating a node stage volume process and a node publish volume process for a persistent volume to be mounted to the container;
      in response to a determination that the persistent volume has been published, initiating a container publish volume request applicable to the persistent volume; and
      mounting the persistent volume to the container.

2. The system of claim 1, wherein the container is generated prior to the mounting of the persistent volume to the container.

3. The system of claim 1, wherein the operations further comprise:
   monitoring, using a container storage interface controller, a mount status of the persistent volume.

4. The system of claim 1, wherein the operations further comprise:
   after the mounting of the persistent volume to the container, and in response to a determination that the persistent volume has become unmounted from the container, determining whether the persistent volume is remountable to the container.

5. The system of claim 4, wherein the operations further comprise:
   in response to a determination that the persistent volume is remountable to the container, remounting the persistent volume to the container.

6. The system of claim 4, wherein the persistent volume is a first persistent volume, and wherein the operations further comprise:
   in response to a determination that the persistent volume is not remountable to the container, initiating a node stage volume process and a node publish volume process for a second persistent volume to be mounted to the container;
   in response to a determination that the second persistent volume has been published, initiating a container publish volume request applicable to the second persistent volume; and
   mounting the second persistent volume to the container.

7. The system of claim 6, wherein the second persistent volume is mounted to the container without restarting the container.

8. The system of claim 1, wherein the operations further comprise:
   in response to a determination that an unmount condition applicable to the persistent volume has been satisfied, unmounting, without stopping the container, the persistent volume from the container.

9. The system of claim 8, wherein the operations further comprise:
   in response to a determination that a remount condition applicable to the persistent volume has been satisfied, remounting, without stopping the container, the persistent volume to the container.

10. The system of claim 9, wherein the unmount condition comprises a defined maintenance operation, and wherein the remount condition comprises a determination that the defined maintenance operation has completed.

11. A non-transitory machine-readable medium, comprising executable instructions that, when executed by at least one processor, facilitate performance of operations, comprising:
    in response to a determination that an unmount condition applicable to a first persistent volume mounted to a pod of a container orchestration system has been satisfied, unmounting, without stopping the pod, the first persistent volume from the pod; and
    in response to a determination that a mount condition applicable to a second persistent volume has been satisfied, mounting, without stopping the pod, the second persistent volume to the pod.

12. The non-transitory machine-readable medium of claim 11, wherein the operations further comprise:
    initiating a node stage volume process and a node publish volume process for the second persistent volume; and
    in response to a determination that the second persistent volume has been published, initiating a container publish volume request applicable to the second persistent volume.

13. The non-transitory machine-readable medium of claim of claim 12, wherein the unmount condition comprises a persistent volume storage size change condition, and wherein the mount condition comprises a determination that the second persistent volume comprises a storage size that satisfies the persistent volume storage size change condition.

14. The non-transitory machine-readable medium of claim 11, wherein the second persistent volume is mounted to the pod without restarting the pod.

15. The non-transitory machine-readable medium of claim 11, wherein the operations further comprise:
    monitoring, using a container storage interface controller, a first mount status of the first persistent volume and a second mount status of the second persistent volume.

16. A method, comprising:
    in response to a determination that a late binding condition associated with a generation of a pod in a pod orchestration system has been satisfied, generating, by a system comprising at least one processor, the pod;
    concurrently with the generating of the pod, initiating, by the system, a node stage volume process and a node publish volume process for a persistent volume to be mounted to the pod;
    in response to a determination that the persistent volume has been published, initiating, by the system, a container publish volume request applicable to the persistent volume; and
    mounting, by the system, the persistent volume to the pod.

17. The method of claim 16, wherein the pod has been granted system administrator authorization associated with permission corresponding to a system administrator.

18. The method of claim 16, wherein the persistent volume is mounted to the pod without stopping the pod.

19. The method of claim 16, further comprising:
    after the mounting of the persistent volume to the pod, and in response to a determination that the persistent volume is unmounted from the pod, determining, by the system, whether the persistent volume is remountable to the pod.

20. The method of claim 19, further comprising:

in response to a determination that the persistent volume is remountable to the pod, mounting, by the system, the persistent volume to the pod.

\* \* \* \* \*